No. 832,256. PATENTED OCT. 2, 1906.
A. E. GUY.
BLOWER.
APPLICATION FILED APR. 3, 1905.
2 SHEETS—SHEET 1.
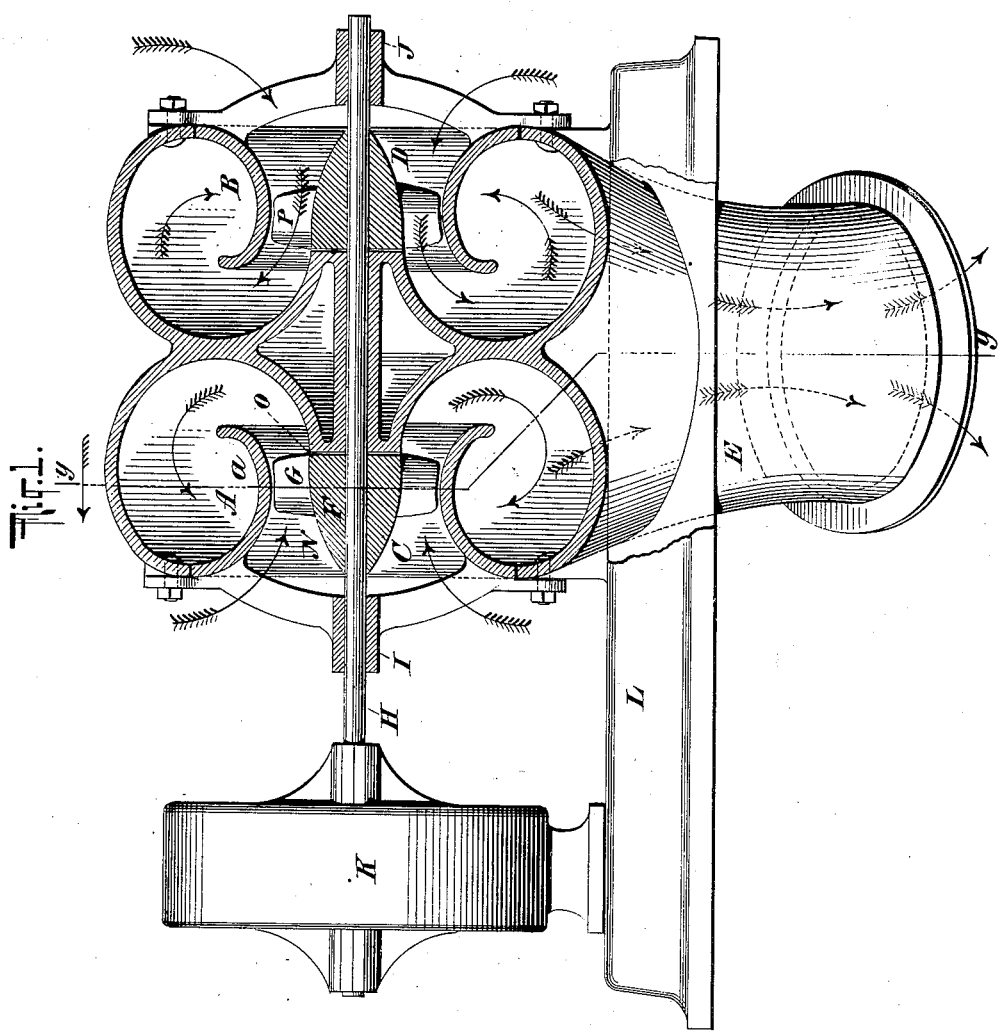
WITNESSES:
Gustav Dieterich
Edwin N. Dutend.
INVENTOR
Albert E. Guy
BY
his ATTORNEY No. 832,256.
PATENTED OCT. 2, 1906.
A. E. GUY.
BLOWER.
APPLICATION FILED APR. 3, 1905.
2 SHEETS—SHEET 2.
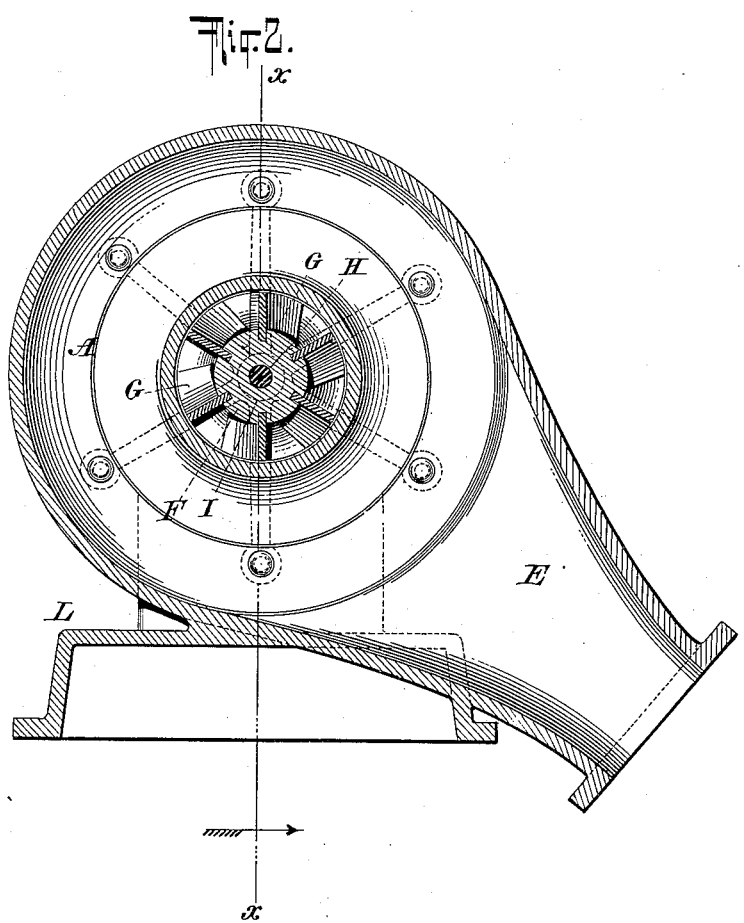
WITNESSES:
Gustave Dieterich.
Edwin H. Dieterich.
INVENTOR
Aebert E. Guy
BY
ATTORNEY

UNITED STATES PATENT OFFICE.

ALBERT E. GUY, OF TRENTON, NEW JERSEY, ASSIGNOR TO DELAVAL STEAM TURBINE COMPANY, OF NEW YORK, N. Y.

BLOWER.

No. 832,256.  Specification of Letters Patent.  Patented Oct. 2, 1906.

Application filed April 3, 1905. Serial No. 253,446.

*To all whom it may concern:*

Be it known that I, ALBERT E. GUY, of Trenton, Mercer county, New Jersey, have invented a new and useful Improvement in Blowers, of which the following is a specification.

The invention relates to a blower wherein the velocity of the incoming current of elastic fluid is gradually converted into pressure without shock or undue friction.

The invention consists in an annular duct spiral in section, in combination with means centrally disposed in the inlet inclosed by the inner wall of said duct for establishing the incoming current; also, in the construction herein set forth whereby two of said ducts, each having a centrally-disposed rotary impeller mounted on the same shaft, are arranged to deliver to a common outlet; also, in the specific details of construction more particularly set forth in the claims.

In the accompanying drawings, Figure 1 is a longitudinal vertical section through my improved blower on the line $x\ x$, Fig. 2, the actuating-motor being shown in elevation. Fig. 2 is a section on the line $y\ y$ of Fig. 1.

Similar letters of reference indicate like parts.

The apparatus is here represented as duplex—that is, with two annular ducts A B, placed side by side, each having a central inlet C or D, through which the fluid passes to said ducts and afterward to the common outlet E. The wall of each duct is spiral in section taken in a plane including the central axis of said duct. On one side of the duct the wall curves inwardly to form the inlet C. On the opposite side the wall curves inwardly to form a central projection which enters the inlet C.

In order to establish a current of elastic fluid into the duct, there is provided an impeller-wheel G, secured on a shaft H, journaled in bearings I J, actuated by any suitable motor K. The motor and chamber may be supported on a bed-plate L. This wheel is centrally disposed in the inlet C of duct A. The hub F has its inner face O registering with the flat outer circular face of said central projection and in section is of ogival contour, as shown at N, so that the inlet-passage is thus rendered annular. Because of the spiral shape of the duct the velocity of the fluid impelled by the wheel G is gradually reduced from inlet to outlet while the pressure is augmented.

In the form of my device here shown two impeller-wheels G P are employed, one for each duct, and both fast on the same shaft H. As the ducts are disposed with their inlets on relatively opposite sides, the wheel-blades are set in relatively opposite directions. This balances end thrust on the shaft H and when the apparatus is driven by a high-speed turbine prevents any end thrust in that motor. The arrows indicate the course of the elastic fluid.

I claim—

1. A fixed annular duct spiral in section and means centrally disposed in the inlet inclosed by the inner wall of said duct for establishing a current of elastic fluid through said duct.

2. A fixed annular duct spiral in section and a rotary impeller centrally disposed in the inlet inclosed by the inner wall of said duct.

3. An annular duct spiral in cross-section and a rotary hub of ogival longitudinal cross-section disposed apex outward centrally in said duct and impeller-blades on said hub.

4. Two annular ducts spiral in cross-section, an outlet common to both, a rotary axial shaft extending through said ducts and two impellers on said shafts and respectively disposed in the inlets to said ducts; the said impellers being constructed to produce fluid-flow into said ducts in relatively opposite directions.

In testimony whereof I have signed my name to this specification in the presence of two subscribing witnesses.

ALBERT E. GUY.

Witnesses:
PARK BENJAMIN, Jr.,
JANET A. GLENDINNING.